(12) United States Patent
Matsuno

(10) Patent No.: US 6,210,273 B1
(45) Date of Patent: Apr. 3, 2001

(54) DISPLAYING AREA FOR A WEAPON'S ATTACK RANGE AND AREAS FOR CAUSING DIFFERENT DAMAGE AMOUNTS ON AN ENEMY

(75) Inventor: Yasumi Matsuno, Tokyo (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/537,105

(22) Filed: Mar. 29, 2000

(30) Foreign Application Priority Data

Jun. 30, 1999 (JP) .................................................. 11-185576

(51) Int. Cl.$^7$ ...................................................... A63F 13/00
(52) U.S. Cl. .................................................. 463/8; 463/31
(58) Field of Search .................................. 463/1, 8, 2, 5, 463/43, 44, 23, 29, 31

(56) References Cited

U.S. PATENT DOCUMENTS

| | | | |
|---|---|---|---|
| 4,487,583 | * 12/1984 | Brucker et al. | 463/5 |
| 4,491,324 | * 1/1985 | Yoshida | 463/8 |
| 5,649,862 | * 7/1997 | Sakaguchi et al. | 463/1 |
| 5,880,709 | * 3/1999 | Itai et al. | 345/113 |
| 6,093,105 | * 7/2000 | Morihira | 463/38 |
| 6,102,801 | * 8/2000 | Sugawara | 463/31 |
| 6,110,215 | * 8/2000 | Stone | 703/6 |

FOREIGN PATENT DOCUMENTS 7-148351   6/1995  (JP) .

\* cited by examiner

Primary Examiner—Michael O'Neill
(74) Attorney, Agent, or Firm—Greenblum & Bernstein, P.L.C.

(57) ABSTRACT

A game provides a character or target object with multiple attack points or defense points and controls damage inflicted on or damage received by an attack for each attack point or defense point. An enemy character is provided with multiple attack points in advance. Attack area data is provided for each weapon or magic in advance. An attack area of a weapon or magic is displayed on a display screen in accordance with the weapon or magic selected by the player at the time of a fight. Attack points positioned in the attack area are detected. An attack on the detected attack points is authorized. A player selects and attacks, as an object of attack, any point from among the attack points for which an attack is authorized. The damage caused by the attack is controlled for each attack point (defense point). Thus, the modes of the fight scene are diversified and the tactical nature or interest of the game are improved.

18 Claims, 17 Drawing Sheets

Fig. 3

| | | |
|---|---|---|
| ATTACK POWER | 80 | 201 |
| HIT RATE | 75% | 202 |
| DEFENSE POWER | 65 | 203 |
| EVASION RATE | 23% | 204 |
| CHARACTER COORDINATES | Po(Xo,Yo,Zo) | 205 |
| ⋮ | ⋮ | |

Fig. 4

| WEAPON AND MAGIC | ATTACK AREA SETTING DATA | | |
|---|---|---|---|
| | SHAPE | SIZE | ANGLE (DEGREES) |
| FIRE (MAGIC) | SPHERE | (15,15,15) | 0 |
| POWER HAMMER (WEAPON) | PRISM | (20,20,10) | 45 |
| BRONZE SWORD (WEAPON) | CONE | (10,10,15) | 0 |
| SPEAR (WEAPON) | CYLINDER | (10,10,20) | 90 |
| ⋮ | ⋮ | ⋮ | ⋮ |

Fig. 7

| | CHARACTER COORDINATES | ATTACK POINT | COORDINATE DATA | CORRECTION VALUE | |
|---|---|---|---|---|---|
| | 221 | 222 | 223 | ATTACK POWER 225 | HIT RATE 226 / 22 224 |
| ENEMY CHARACTER 1 | P1(X1,Y1,Z1) | HEAD | (Xa,Ya,Za) | 1.0 | 1.3 |
| | | ARMS | (Xb,Yb,Zb) | 1.0 | 1.0 |
| | | STOMACH | (Xc,Yc,Zc) | 1.5 | 1.2 |
| | | BACK | (Xd,Yd,Zd) | 0.7 | 0.5 |
| | | LEGS | (Xe,Ye,Ze) | 1.0 | 1.0 |
| ENEMY CHARACTER 2 | P2(X2,Y2,Z2) | HEAD | (Xf,Yf,Zf) | 1.0 | 0.8 |
| | | CHEST | (Xg,Yg,Zg) | 1.2 | 1.3 |
| | | STOMACH | (Xh,Yh,Zh) | 1.5 | 1.2 |
| | | TAIL | (Xi,Yi,Zi) | 0.5 | 0.4 |
| | ---------- | ---------- | ---------- | ---------- | ---------- |

Fig.13

| | | | |
|---|---|---|---|
| ATTACK POWER | | 80 | 301 |
| HIT RATE | | 75% | 302 |
| DEFENSE POWER | | 65 | 303 |
| EVASION RATE | | 16% | 304 |
| LP | | 1453 | 305 |
| HP | HEAD | 270 | 306 |
| | ARMS | 235 | |
| | CHEST | 310 | |
| | STOMACH | 245 | |
| | LEGS | 147 | |
| ⋮ | | ⋮ | |

Table 30

Fig.14

| MAIN DEFENSE POINT | SECONDARY DEFENSE POINT REACHED BY DAMAGE (311) | PROPORTION OF DAMAGE REACHED (312) |
|---|---|---|
| HEAD | ARMS | 5% |
| | CHEST | 8% |
| CHEST | HEAD | 5% |
| | ARMS | 7% |
| | STOMACH | 10% |
| ARMS | CHEST | 3% |
| STOMACH | CHEST | 8% |
| | LEGS | 7% |
| LEGS | STOMACH | 5% |

Table 31

Fig. 15

| DEFENSE POINT | HP MAXIMUM VALUE (321) | CONTENT OF CONTROL (322) ||
|---|---|---|---|
| | | HP VALUE 50% OR LESS | HP VALUE 0% |
| HEAD | 270 | · DISPLAY HEAD IN ORANGE COLOR<br>· REDUCE ATTACK POWER AND DEFENSE POWER BY 20% | · DISPLAY HEAD IN BLINKING RED COLOR<br>· REDUCE ATTACK POWER AND DEFENSE POWER BY 30% |
| ARMS | 235 | · DISPLAY ARMS IN ORANGE COLOR<br>· REDUCE ATTACK POWER AND HIT RATE BY 20% | · DISPLAY ARMS IN BLINKING RED COLOR<br>· DISABLE ATTACK BY WEAPON |
| ---- | ---- | ---- | ---- |
| LEGS | 147 | · DISPLAY LEGS IN ORANGE COLOR<br>· REDUCE SPEED OF MOVEMENT BY 20%<br>· REDUCE HIT RATE AND EVASION RATE BY 10% | · DISPLAY LEGS IN BLINKING RED COLOR<br>· DISABLE MOVEMENT<br>· REDUCE HIT RATE AND EVASION RATE 30% |

32

| DEFENSE POINT | COORDINATE DATA | DISTANCE | PROPORTION OF DAMAGE REACHED |
|---|---|---|---|
| HEAD | (Xa, Ya, Za) | 0 ~ 50 | 5 % |
| | | 50 ~ 70 | 3 % |
| CHEST | (Xb, Yb, Zb) | 0 ~ 50 | 7 % |
| | | 50 ~ 70 | 5 % |
| | | 75 ~ 100 | 3 % |
| ARMS | (Xc, Yc, Zc) | 0 ~ 45 | 10 % |
| STOMACH | (Xd, Yd, Zd) | 0 ~ 30 | 6 % |
| | | 30 ~ 60 | 4 % |
| LEGS | (Xe, Ye, Ze) | 0 ~ 100 | 5 % |

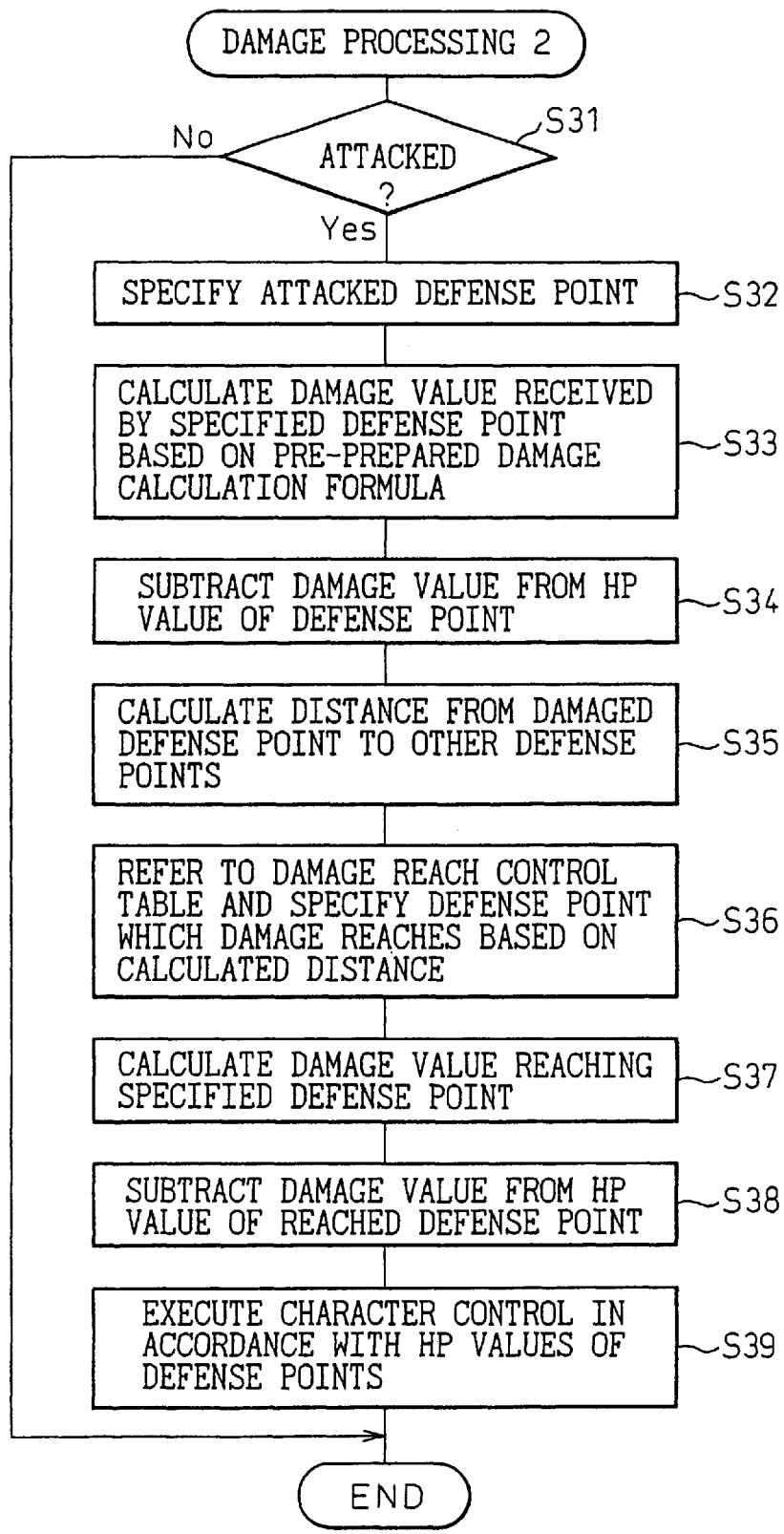

DISPLAYING AREA FOR A WEAPON'S ATTACK RANGE AND AREAS FOR CAUSING DIFFERENT DAMAGE AMOUNTS ON AN ENEMY

BACKGROUND OF THE INVENTION

1. Field of the Invention

The present invention relates to a program product storing a program for controlling a video game, a method of control of a video game, and a game system.

2. Description of the Related Art

Some video games pit a player against an enemy character or target object for attack in a fight. For example, such games belong to the genre of role playing games (RPG), action games, and simulation games.

In such a video game, the degree of injury received by an enemy character or other target object (that is, "damage") due to an attack instruction from the player or the damage received by the character controlled by the player (hereinafter referred to as the "player character") due to an attack from the target object is controlled, for example, based on the technique described below. That is, the technique calculates the value of the damage by entering a parameter value of attack power or defense power provided in advance for each target object or player character and data, such as the type of attack or defense, into a predetermined calculation formula. Further, there are video games changing the method of calculation of damage by introducing random numbers into the calculation formula.

Summarizing the problem to be solved by the invention, in the above video games, the general practice is to repeat the above type of fight until ending the game completely. Therefore, to prevent the player from losing interest, it is important to introduce changes into the mode of the fight such as the method of calculation of damage. Further, to increase the interest of the game by introducing greater diversity into the mode of the fight, it is necessary to specially devise the method of attack on the target object or method of control of the damage. Further, it is necessary to specially devise a method to control the change of status of the character or target object in accordance with the damage received.

SUMMARY OF THE INVENTION

An object of the present invention is to provide a game providing a character or target object with multiple attack points or defense points and controlling damage given or damage received due to an attack on each attack point or defense point.

According to a first aspect of the present invention, there is provided a computer readable program product for storing a game program. The product stores a program providing multiple attack points on a target object positioned in an attack area set in a virtual space and making the computer display the attack area showing an effective range of attack when an attack on said target object is instructed in response to an operation. The computer also detects attack points positioned in the displayed attack area, and obtains a fight result based on the attack for at least one detected attack point.

According to a second aspect of the present invention, there is provided a computer readable program product for storing a game program. The product stores a program providing multiple defense points for judging damage on a character on a display screen due to an attack from an opponent character during progress of a game. The program makes the computer judge a main defense point directly receiving an attack from the opponent character among the defense points and a magnitude of the damage, and specify secondary defense points positioned near the judged main defense point and reached by damage from the main defense point. The computer also calculates the magnitude of the damage reaching the specified secondary defense points based on the damage to the main defense point, and updates the amount of damage of the character based on the calculated magnitude of the damage.

According to a third aspect of the present invention, there is provided a computer readable program product for storing a game program. The product stores a program providing multiple attack points on a target object positioned in an attack area set in a virtual space. The product makes the computer form an attack screen for the target object in response to an input operation, and display an attack area showing an effective range of attack designated in response to an input operation on the formed attack screen. The computer also highlights attack points positioned in the displayed attack area, and obtains a fight result based on the attack for at least one highlighted attack point.

According to a fourth aspect of the present invention, there is provided a method of control of a game. The method includes providing multiple attack points on a target object positioned in an attack area set in a virtual space, and displaying an attack area showing an effective range of attack when an attack on the target object is instructed in response to an operation on a player character. The method also includes detecting attack points positioned in the displayed attack area, and obtaining a fight result based on the attack for at least one detected attack point.

According to a fifth aspect of the present invention, there is provided a method of control of a game. The method includes providing multiple defense points for judging damage on a character on a display screen due to an attack from an opponent character in the progress of a game, and judging a main defense point directly receiving an attack from the opponent character among the defense points and a magnitude of the damage. The method also includes specifying secondary defense points positioned near the judged main defense point and reached by damage from the main defense point, calculating the magnitude of the damage reaching the specified secondary defense points based on the magnitude of the damage to the main defense point, and updating the amount of damage of the character based on the calculated magnitude of the damage.

According to a sixth aspect of the present invention, there is provided a method of control of a display. The method includes providing multiple attack points on a target object positioned in an attack area set in a virtual space, forming an attack screen for the target object in response to an input operation, and displaying an attack area showing an effective range of attack designated in response to an input operation on the formed attack screen. The method also includes highlighting attack points positioned in the displayed attack area, and obtaining a fight result based on the attack for at least one highlighted attack point.

According to a seventh aspect or the present invention, there is provided a mechanism comprising a computer for controlling a program and a program product storing a program for making the computer control the game. The program provides multiple attack points on a target object positioned in an attack area set in a virtual space and makes the computer display an attack area showing an effective range of attack when an attack on the target object is instructed in response to an operation of a player. The computer also detects attack points positioned in the displayed attack area, and obtains a fight result based on the attack for at least one detected attack point.

According to an eighth aspect of the present invention, there is provided a mechanism comprising a computer for controlling a program and a program product storing a program for making the computer control the game. The program provides multiple defense points for judging damage on a character on a display screen due to an attack from an opponent character in the progress of a game and makes the computer judge a main defense point directly receiving an attack from the opponent character among the of defense points and a magnitude of the damage. The computer also specifies secondary defense points positioned near the judged main defense point and reached by damage from the main defense point, calculates the magnitude of the damage reaching the specified secondary defense points based on the magnitude of the damage to the main defense point, and updates the amount of damage of the character based on the calculated magnitude of the damage.

According to a ninth aspect of the present invention, there is provided a mechanism comprising a computer for controlling a program and a program product storing a program for making the computer control the game. The program provides multiple attack points on a target object positioned in an attack area set in a virtual space and makes the computer form an attack screen for the target object in response to an input operation. The computer also displays an attack area showing an effective range of attack designated in response to an input operation on the formed attack screen, highlights attack points positioned in the displayed attack area, and obtains a fight result based on the attack for at least one highlighted attack point.

BRIEF DESCRIPTION OF THE DRAWINGS

These and other objects and features of the present invention will become clearer from the following description of the preferred embodiments given with reference to the attached drawings, in which:

FIG. 3 is a view of a data structure of a fight control table stored in the RAM shown in FIG. 2;

FIG. 4 is a view of a data structure of an attack area setting table stored in the RAM shown in FIG. 2;

FIG. 7 is a view of a data structure of an attack point setting table stored in the RAM shown in FIG. 2;

FIG. 13 is a view of a data structure of a status table stored in the RAM shown in FIG. 22;

FIG. 14 is a view of a data structure of a damage reach control table stored in the RAM shown in FIG. 12;

FIG. 15 is a view of a data structure of a character control table stored in the RAM shown in FIG. 12;

FIG. 19 is flow chart of the damage processing of the third embodiment.

DESCRIPTION OF THE PREFERRED EMBODIMENTS

Preferred embodiments of the present invention will now be explained below with reference to the drawings. Note that while the following explanation will be given for the case of application of the present invention to a home game system, the present invention is not limited to a home game system.

First Embodiment

Figure 1:
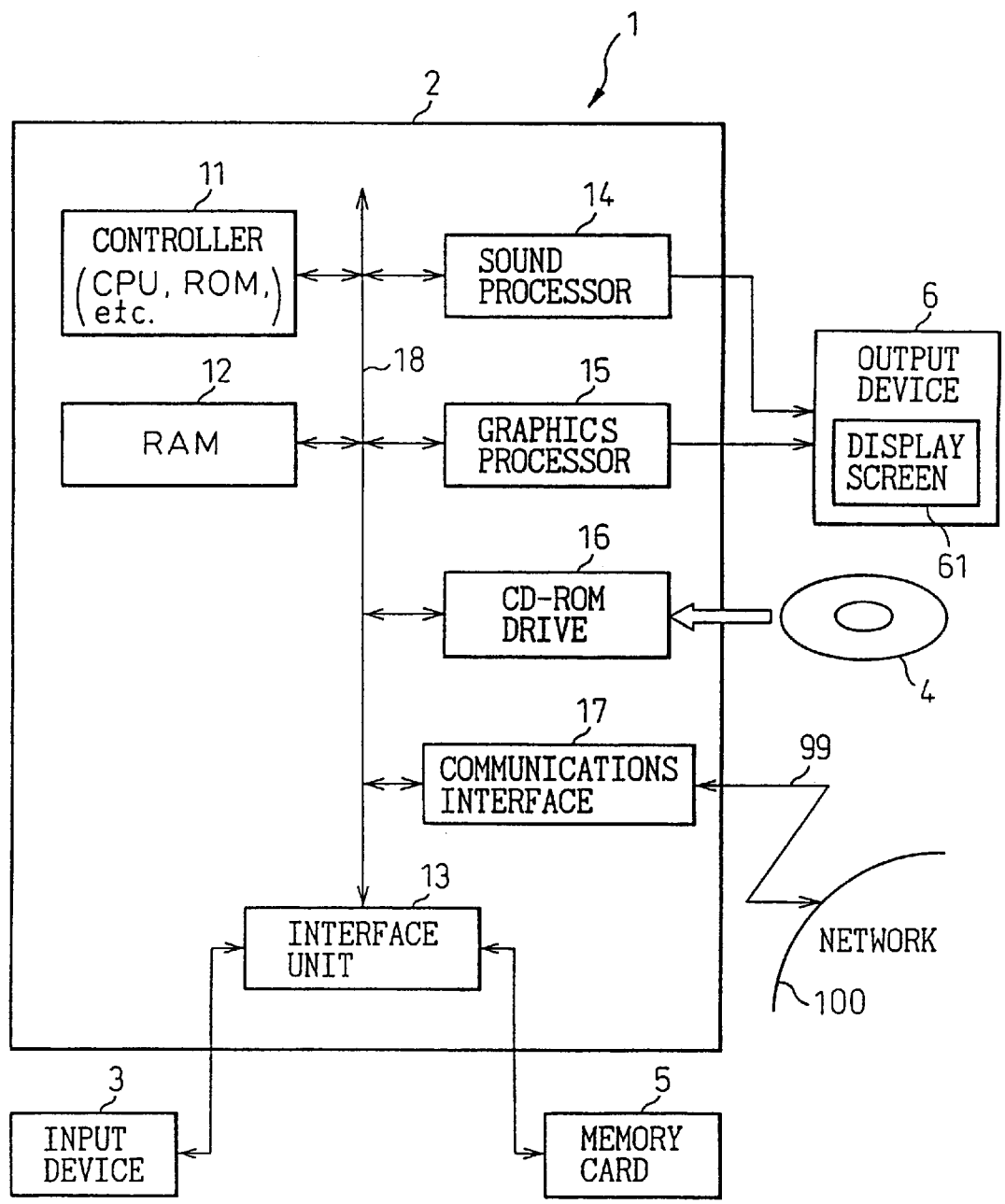
FIG. 1 is a block diagram of an exemplary overall configuration of a game system, according to an aspect of the present invention.

FIG. 1 is a block diagram of the overall configuration of a game system, according to an aspect of the present invention.

The game system 1 is, roughly speaking, comprised of a console 2 having the main functions of the game system 1, an input device (controller) 3 for inputting operating instructions to the game system unit 2, a memory card 5 for storing the data of the game in progress, the data on the settings of the game environment, and other data to be saved, and an output device 6 for displaying an image or outputting sound in accordance with the content of the game based on a video signal or audio signal from the game system unit 2.

The console 2 for example is provided with a controller 11, random access memory (RAM) 12, interface unit 13, sound processor 14, graphics processor 15, compact disc read only memory (CD-ROM) drive 16, communications interface 17, and bus 18 connecting these components. Further, the CD-ROM drive 16 is configured to be able to be loaded with a program product 4 such as a CD-ROM storing a program, image data, sound data, etc. for realizing processing relating to the later explained game.

The controller 11 is a circuit comprised of a central processing unit (CPU), read only memory (ROM), etc. The CPU controls the components in accordance with a program stored in the RAM 12 (in some cases, the ROM). Further, the controller 11 is provided with an oscillator and a tinier counter (both not shown).

The interface unit 13 is configured to be able to be connected to the input device 3 and memory card 5. The interface unit 13 controls the transfer of data between the components connected to the bus 18 (mainly the controller 11) and the input device 3 or memory card 5.

The sound processor 14 is a circuit having the function of producing background music (BGM) or sound effects for the game. The sound processor 14 generates an audio signal in accordance with commands from the controller 11 based on data stored in the RAM 12. The generated audio signal is output to the output device 6.

The graphics processor 15 is provided with a frame buffer (not shown). The graphics processor 15 draws an image in accordance with commands from the controller 11 on the frame buffer. Further, the graphics processor 15 generates a video signal for displaying the image data drawn in the frame buffer. The generated video signal is output to the output device 6.

The CD-ROM drive 16 is a reader for reading data stored in the program product 4, here, the CD-ROM. The game system 1 makes the controller 11 perform control in accordance with a game program stored in the CD-ROM. By this, control relating to the later explained game is realized.

The communications interface 17 is a circuit for control of communications when exchanging various data with another apparatus on a network 100. The communications interface 17 is connected to the network 100 through a communications line 99 in accordance with need.

Figure 2:
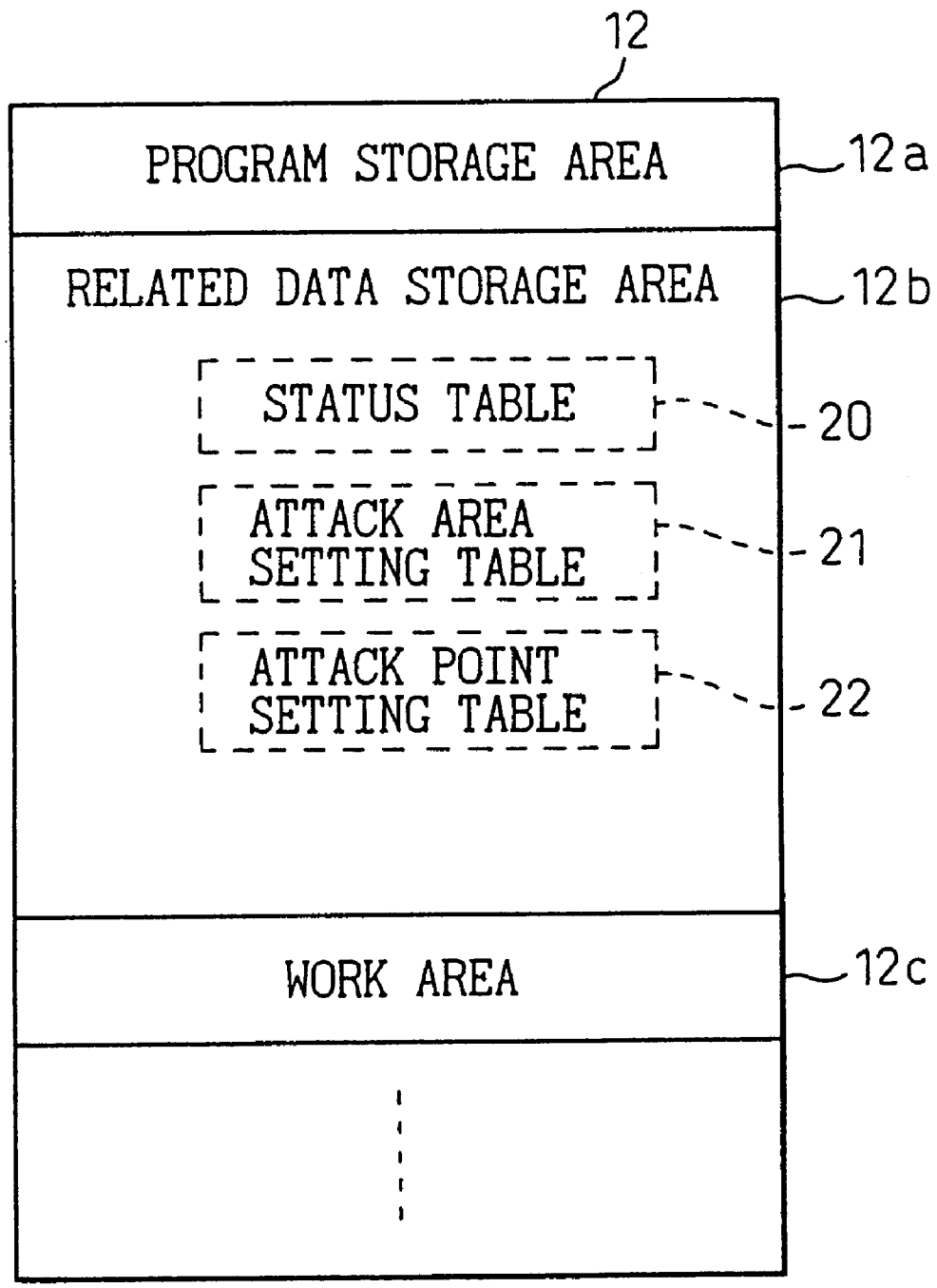
FIG. 2 is a view of a memory configuration of a RAM in a first embodiment.

FIG. 2 is a view of a memory configuration of the RAM 12 shown in FIG. 1.

The RAM 12 has for example a program storage area 12a, a related data storage area 12b, a work area 12c, etc. The program storage area 12a stores the program to be executed by the controller 11. The related data storage area 12b stores the later explained status table 20, attack area setting table 21 and attack point setting table 22. The work area 12c stores data required for execution of the various processing during the game.

FIG. 3 is a view of a data structure of the status table 20.

The status table 20 is a table for storing the fight data of the player character. The status table 20 is configured with, for example, an "ATTACK POWER" row 201, "HIT RATE" row 202, "DEFENSE POWER" row 203, "EVASION RATE" row 204, and "CHARACTER COORDINATES" row 205 storing the attack power, hit rate, defense power, evasion rate, and character coordinates.

The "ATTACK POWER" row 201 stores the value of the attack power provided to the player character. The "HIT RATE" row 202 stores the probability of the attack of the player character hitting the enemy character or target object. The "DEFENSE POWER" row 203 stores the value of the defense power provided to the player character. The "EVASION RATE" row 204 stores the probability of evasion of a hit by an attack of an enemy character. The "CHARACTER COORDINATES" row 205 stores the reference coordinate data $P_0$ ($X_0$, $Y_0$, $Z_0$) of the player character. The reference coordinate data specifies the current positin of the player character in the three-dimensional virtual space. The reference coordinate data is referred to when displaying the player character on the display screen 61 of the display of the output device 6 or when displaying a later explained attack area. The values of the fields are suitably updated in accordance with the progress of the game.

While not particularly illustrated, a status table of a similar configuration is stored in the related data storage area 12b for the enemy characters as well. Note that the values of the attack power, hit rate, defense power, and evasion rate may also be calculated based on parameters of weapons or defensive gear which the characters are currently equipped with.

FIG. 4 is a view of a data structure of the attack area setting table 21.

Figure 5:
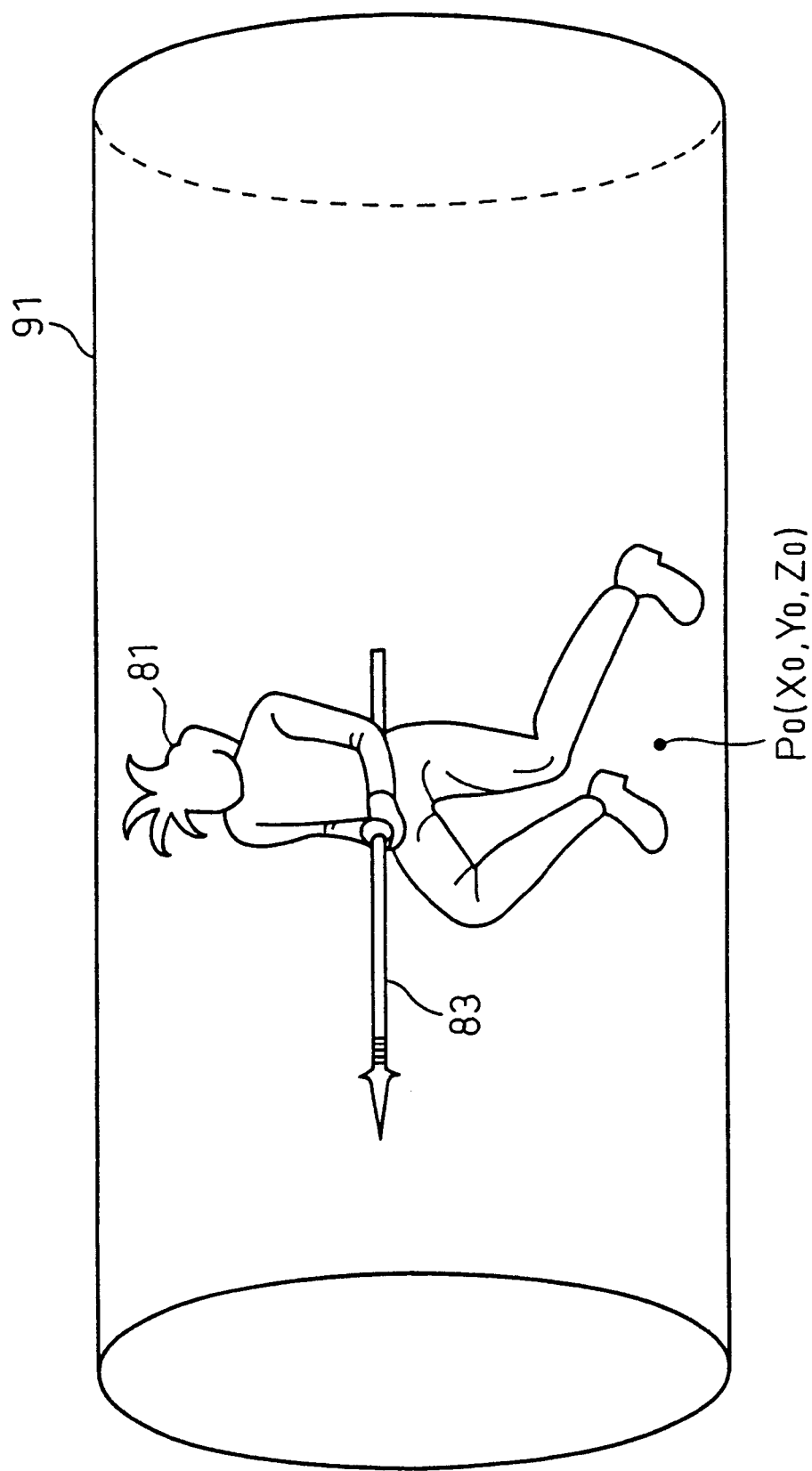
FIG. 5 is a schematic view for explaining an attack area.

In this embodiment, when the player character launches an attack, an area showing three-dimensionally the effective range of the attack, that is, the attack area, is displayed on a display screen 61 of the output device 6 (see FIG. 5). For example, the attack area is generated as an object in a three-dimensional virtual space. Further, the attack area is three-dimensionally displayed by performing perspective transformation on and displaying the generated object.

For example, the attack area setting table 21 shown in FIG. 4 stores data for setting the attack area for attack type magic which the player character can summon and data for setting an attack area for weapons which the player character can arm itself, in correspondence with each type of magic or weapon. For example, the attack area setting table 21 is configured with a "WEAPON AND MAGIC" column 211 and "ATTACK AREA SETTING DATA" columns 212. The "WEAPON AND MAGIC" column 211 stores the names of the attack type magic which the player character can summon or the weapons which the player character can arm itself with (or magic ID (identification number) or weapon ID). Note that the "magic" is a type of act relating to attack, defense, etc. which any character can summon and causes changes in the progress of the game.

The "ATTACK AREA SETTING DATA" columns 212 have a "SHAPE" column 213, "SIZE" column 214, and "ANGLE" column 215. The "SHAPE" column 213 stores the shape of the area such as a sphere, prism, cone, or cylinder. The "SIZE" column 214 stores the size data for defining the size of the shapes of areas stored in the "SHAPE" column 213. The "ANGLE" column 215 stores values of angles defining the inclination of the shapes of areas defined by the size data (for example, 0 degree, 45 degrees, or 90 degrees).

The data stored in the "ATTACK AREA SETTING DATA" columns 212 is used for setting the attack area corresponding to the designated attack type magic or armed weapon when attacking an enemy character. Note that the system may also be configured to provide a deformation rate, direction, or other fields in the attack area setting table 21 and using the field data to deform the shape of the attack area in a specific direction or change the orientation.

Next, an explanation will be given of the attack area.

FIG. 5 is a schematic view of an example of an attack area.

The attack area 91 is set in position based on the reference coordinate data $P_0$ ($X_0$,$Y_0$,$Z_0$) of the player character 81. The attack area 91 shown in FIG. 5 is an attack area corresponding to the "SPEAR" weapon 83.

According to the attack area setting table 21 shown in FIG. 4, the size of the attack area of the "SPEAR" is (10,10,20). In the size data, the first value (in this example, the 10 at the left side), the second value (in this example, the 10 at the center), and the third value (in this example, the 20 at the right side) respectively represent the length, width, and height of a parallelepiped. The unit length in the three-dimensional virtual space is set to 1. The attack area is an area of a shape defined by the "SHAPE" column 213 of the attack area setting table 21 of the maximum size fitting in the parallelepiped. Here, the length, width, and height of the parallelepiped are respectively matched with the x-direction, y-direction, and z-direction in a three-dimensional orthogonal coordinate system, that is, the xyz coordinate system.

Further, according to the attack area setting table 21 shown in FIG. 4, the shape of the attack area of the "SPEAR" is a cylinder. Further, the inclination of the attack area of the "SPEAR" 83 is 90 degrees. Therefore, when the player character 81 attacks with a "SPEAR" 83, an attack area 91 of a shape of a cylinder of a diameter of 10 and a height of 20 inclined 90 degrees, that is, laid laterally, is displayed based on the reference coordinate data $P_0$ ($X_0$,$Y_0$, $Z_0$) of the player character 81.

Figure 6:
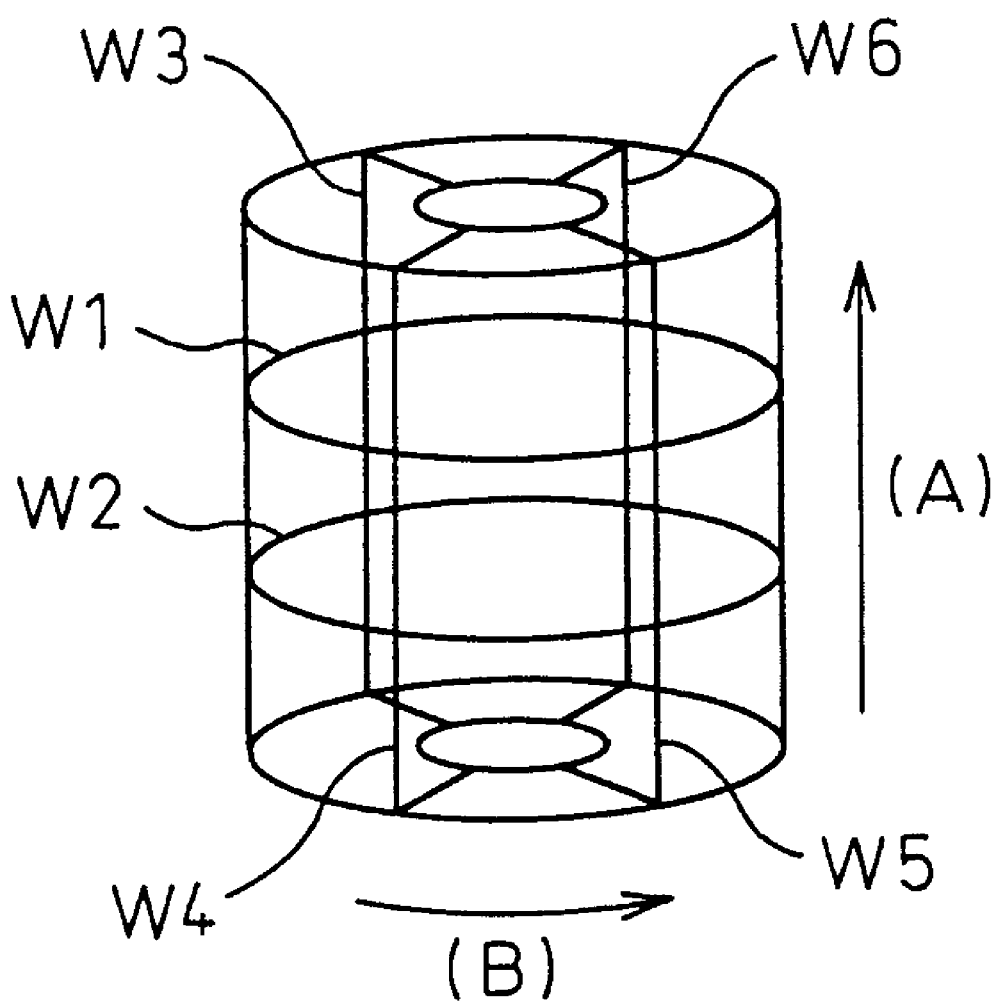
FIG. 6 is a schematic view for explaining an attack area.

FIG. 6 is a schematic view for explaining a display mode of an attack area.

In the present embodiment, the attack area is displayed three-dimensionally as a wire frame model. Here, the "wire frame model" is a model showing the contours of an area (here, an attack area) by line images, that is, wires. Note that, for example, this may be supplemented by virtual planes or smooth curves formed by coloring semitransparently between the wires.

Further, in this embodiment, in the wire frame model, the wires move at a constant speed along the contours of the area. By the paths of movement of the wires or by comprehensively viewing all together the paths of movement of the wires, the three-dimensional feeling of the attack area is amplified.

For example, in the case of the cylindrical area shown in FIG. 6, the wires W1 and W2 provided along the sides to laterally ring the cylinder move from below to above (or vice versa) as shown by the arrow (A) in the figure. Further, the wires W3, W4, W5, and W6 extending radially out at the top surface, stretching down along the sides in the longitudinal direction, and extending toward the center at the bottom surface so as to divide the cylinder radially longitudinally, rotate about the longitudinal axis of the cylinder, as shown by the arrow (B) of the figure.

FIG. 7 is a view of the data structure of the attack point setting table 22.

The attack point setting table 22 is a table for storing data relating to an attack point set for the enemy character for all enemy characters which the player character could fight. The attack point setting table 22 is configured for example with the "CHARACTER COORDINATES" column 221, "ATTACK POINT" column 222, "COORDINATE DATA" column 223, and "CORRECTION VALUE" columns 224.

The "CHARACTER COORDINATES" column 221 stores the three-dimensional coordinate data specifying the current positions of the enemy characters. The "ATTACK POINT" column 222 stores the data of the attack points which the player character can attack. The attack points are preset for each enemy character. The "COORDINATE DATA" column 223 stores the coordinate data showing the relative positions with respect to the character coordinate data for all attack points. It is judged if the attack points are positioned in the attack area based on the coordinate data.

The "CORRECTION VALUE" columns 224 stores reduction values for correcting the fight power of the player character in accordance with an attack point to be attacked by the player character when the point is designated. As the correction value, in the present embodiment, for example, the attack power and hit rate are set. The reduction values of the attack power and hit rate are stored in the "ATTACK POWER" column 225 and "HIT RATE" column 226. When the reduction value is 1.0, the attack power and the hit rate are standard. That is, the attack power and hit rate for an attack point with a reduction value of 1.0 becomes the attack power and hit rate of the player character stored in the status table 20 (see FIG. 3).

The attack power of a player character for an attack point with a reduction value larger than 1.0 becomes stronger than the attack power stored in the status table 20. Further, the hit rate of the attack becomes higher than the hit rate stored in the status table 20. Therefore, for an enemy character, an attack point with a reduction value larger than 1.0 becomes a weak point.

Conversely, an attack power of a player character with a reduction value smaller than 1.0 becomes weaker than the attack power stored in the status table 20. Further, the hit rate of the attack becomes weaker than the hit rate stored in the status table 20. Therefore, for an enemy character, an attack point with a reduction value smaller than 1.0 becomes more resistant to damage even if attacked. In this way, in the present embodiment, the damage can be changed by the correction value in accordance with the location on the enemy character. That is, damage properties can be given to each location of an enemy character such as weakness for the chest and stomach and strength for the back or tail.

In the present embodiment, the attack area designated in accordance with an input operation is displayed at the time of an attack. Further, the attack points positioned inside the displayed attack area are detected for an enemy character for which attack points are set in advance. The fight result is obtained based on the attack on one or more of the detected attack points. Therefore, the game system 1 is provided with a displaying means for displaying an attack area, a detecting means for detecting attack points, and a fight result acquiring means for obtaining the fight result.

The detecting means is mainly realized by the controller 11. The displaying means is mainly realized by the graphics processor 15. Further, the fight result acquiring means is mainly realized by the controller 11, the sound processor 14, and the graphic processor 15.

Next, a detailed explanation will be given of the operation of the game system 1 according to the present embodiment.

At startup, the controller 11 reads the program and data necessary for execution of the game from the program product 4, that is, CD-ROM, through the CD-ROM drive 16 and transfers it to the RAM 12 based on an operating system stored in the built-in ROM. Further, the controller 11 executes the program transferred to the RAM 12 to execute the various processing described below. Note that among the control operations performed by the game system 1, there are operations where circuits other than the controller 11 cooperate with the controller 11 for the actual control. For the convenience of the explanation, below an explanation will be made assuming that control involving the controller 11 is directly controlled by the controller 11.

Further, the program and data necessary for execution of the game are actually successively read out from the program product 4, that is, the CD-ROM, and transferred to the RAM 12 in accordance with the state of progress of the processing according to commands from the controller 11. In the explanation given below, however, to facilitate understanding of the invention, detailed explanations of the read operation of the data from the CD-ROM and transfer to the RAM 12 are omitted.

Figure 8:
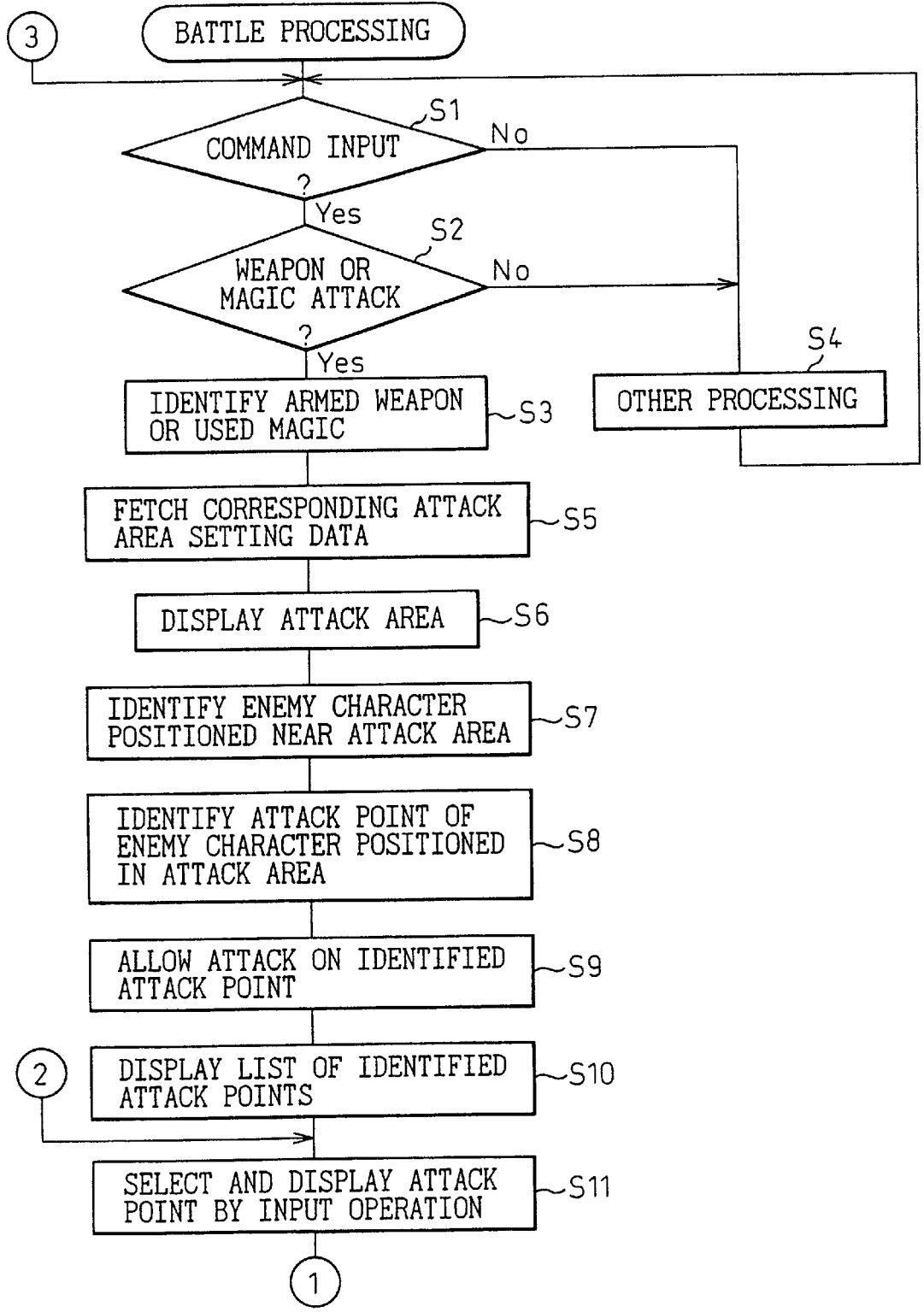
FIG. 8 is a flow chart of battle processing of a first embodiment.
Figure 9:
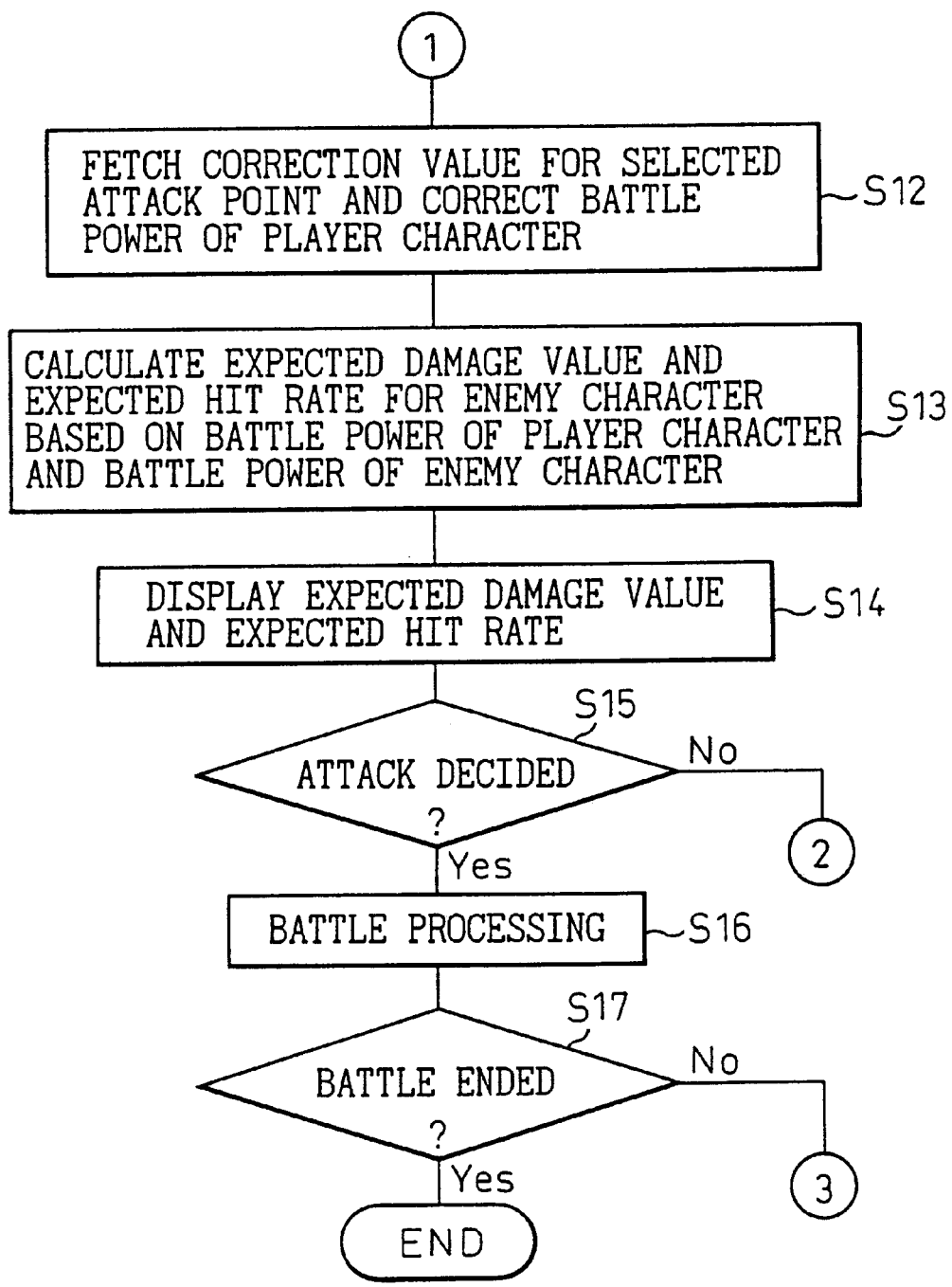
FIG. 9 is a flow chart continuing from FIG. 9.

FIG. 8 to FIG. 9 are flow charts of the battle processing.

Figure 10:
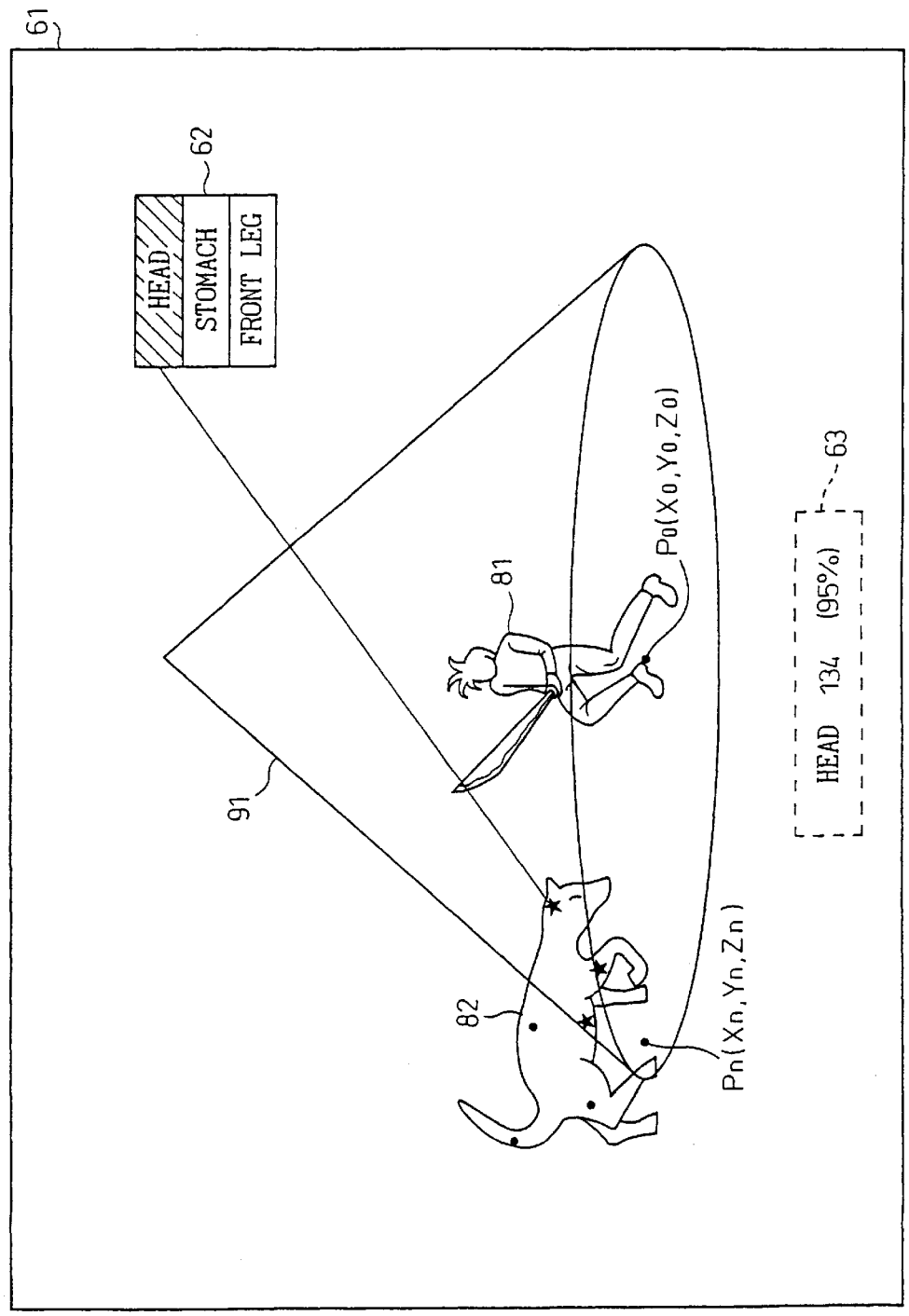
FIG. 10 is a view of an example of a screen display in the battle processing of the first embodiment.
Figure 11:
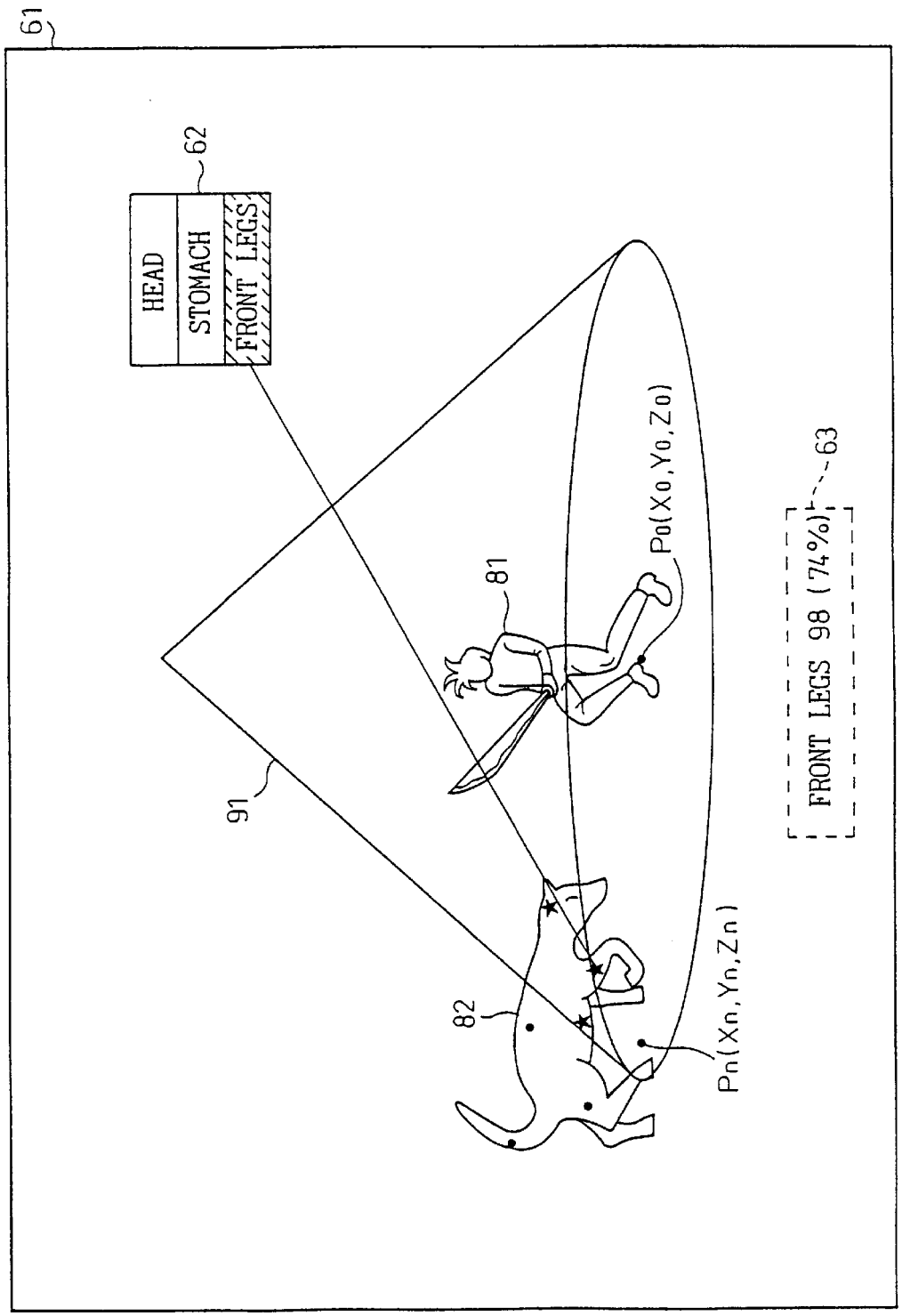
FIG. 11 is a view of an example of a screen display in the battle processing of the first embodiment.

Next, the battle processing will be explained with reference to examples of the screen displays shown in these figures and in FIG. 10 to FIG. 11.

The battle processing is started when the start of a fight with an enemy character is instructed by input of a command during the progress of the game. Alternatively, the battle processing is started when the player character encounters an enemy character based on a predetermined probability during the progress of the game.

As shown in FIG. 8, when battle processing is started, first, it is judged if the input command of the player is a command relating to a fight (step S1). If the input command is a command relating to a fight, it is judged if the command is a command instructing an attack by magic or a weapon (step S2). If the command instructs an attack by a weapon or magic, the weapon which the player character is armed with or the magic which the player character uses is identified (step S3). The information relating to the armed weapon or used magic of the player character is stored in, for example, the status table 20. Therefore, at step S3, the status table 20 is, for example, referred to.

When the input command of the player is not a command relating to a fight at step S1, other processing corresponding to that input command is performed (step S4), then the routine returns to step S1. Further, when the command is not an attack instruction command by a weapon or magic at step S2, in the same way, other processing corresponding to that input command is performed (step S4), then the routine returns to step S1.

When the armed weapon or the used magic of the player character is identified, the attack area setting table 21 (see FIG. 4) is referred to and the attack area setting data corresponding to the armed weapon or used magic is obtained (step S5). Next, the reference coordinate data of the player character is obtained based on the status table 20 (see FIG. 3). The attack area is displayed at the display screen 61 of the output device 6 based on the reference coordinate data of the player character obtained and the attack area setting data obtained at step S5 (step S6).

When the attack area is displayed, the attack point setting table 22 (see FIG. 7) is referred to. Next, the enemy characters positioned near the displayed attack area are identified (step S7). Specifically, the positions of the enemy characters are identified by the controller 11 performing processing based on the data of the display position of the attack area, the shape, size, angle, and other data of the area, and the reference coordinate data of all of the enemy characters. There may be several enemy characters near the attack area.

Next, all of the attack points positioned in the attack area are detected for the enemy characters positioned near the attack area (step S8). Specifically, the attack points in the attack area are identified by the controller 11 performing processing based on the data of the display position of the attack area, the shape, size, angle, and other data of the area, and the coordinate data of the attack points of the enemy characters near the attack area.

Next, the attack on the attack points detected at step S8 is authorized (step S9). A list of the names of the authorized attack point such as "HEAD", "STOMACH", and "FORELEGS" is displayed in a window 62 displayed on the display screen 61 as in the example shown in FIG. 10 (step 510). Further, marks of all of the attack points are displayed on the enemy character 82. The attack points in the attack area 91 and the attack points outside the attack area are displayed by different marks. While not particularly limited, for example, in the example shown in FIG. 10, the attack points in the attack area 91 and the attack points outside the attack area 91 are respectively shown by black stars and black dots Note that in the example shown in FIG. 10, the selected weapon is for example a "BRONZE SWORD". Further, the attack area 91 is basically displayed by a wire frame model. To avoid the illustration from becoming too complicated, in FIG. 10, the wires are omitted (same in FIG. 11). In the illustrated example, the shape of the area of the attack area 91 of the "BRONZE SWORD" weapon is a cone. Therefore, the attack area 91 is displayed at a position where the center coordinates of the bottom surface of the cone matches the reference coordinate data $P_0$ ($X_0, Y_0, Z_0$) of the player character 81.

Returning to FIG. 8, when an attack point is selected in accordance with an input operation, the name of the attack point in the window 62 and the mark showing the attack point on the enemy character 82 are highlighted for the selected point (step S11). For example, the name or mark of the corresponding attack point is displayed by changing its display color or by making it blink. By being highlighted in this way, a player can easily discern the selected attack point.

Therefore, the game system 1 is provided with a highlighting means. This highlighting means is mainly realized by the graphics processor 15, Further, for the selected attack point, the name of the attack point in the window 62 and the mark showing the attack point on the enemy character 82 are connected by a line linking them together.

When the selected attack point is highlighted, the routine proceeds to FIG. 9, where the "CORRECTION VALUE" column 224 of the attack point setting table 22 (see FIG. 7) is referred to. Next, the value of the attack power and the value of the hit rate for the selected attack point of the corresponding enemy character are obtained. These two obtained values are used for correction of the values of the attack power and hit rate of the player character (step S12).

Next, when launching the selected attack using the fight power of the player character based on the values of the attack power and hit rate of the player character after correction and the fight power of the enemy character, the damage value and hit rate expected when inflicted on the enemy character are calculated (step S13). This calculation is performed using a predetermined calculation formula used in the fight processing. To give a sporadic element to the fight, a random number is entered into part of the calculation formula. When calculating the expected values of the damage value and hit rate (hereinafter referred to as the "expected damage value" and the "expected hit rate", respectively), the average value of random numbers is used as the random number entered.

The obtained expected damage value and expected hit rate are displayed on the display screen 61 by the graphics processor 15 (step S14). For example, as shown in FIG. 10, the display screen 61 is provided with an expected value display area 63. The expected value display area 63 displays the name of the selected attack point, the expected damage value, and the expected hit rate.

Returning to FIG. 9, it is judged if the player has decided to launch the attack (step S15). when no decision has been made to launch an attack by an input operation, the routine returns to step S11 of FIG. 8 where the routine is re-performed from the selection of the attack point. That is, the player can re-select the attack point with reference to the expected damage value and expected hit rate displayed on the display screen 61. FIG. 11 shows an example of a display screen when changing the attack point to the "FORELEGS". By changing the attack point, the highlighting of the name of the attack point in the window 62 and the mark showing the attack point on the enemy character 82 and the display of the line for indicating their correspondence are changed. Further, the values of the expected damage value and the expected hit rate are also changed to values corresponding to the attack point.

When it is decided to launch the attack at step S15, the fight processing is performed (step S16). In the fight processing, the parameter values relating to the fight such as the attack powers, defense powers, hit rates, and evasion rates of the player character 81 and the enemy character 82 are entered into a predetermined calculation formula for finding the damage value. Further, a random number is entered into the calculation formula. As a result, the damage value actually inflicted on the enemy character is calculated. The fight is executed by control of the graphics display, control of the sound output, etc. based on the damage value.

After the fight is executed, it is judged if the battle has ended (step S17). If the battle has ended, the battle processing is ended. On the other hand, if the battle continues, the routine proceeds to step S1 of FIG. 8, where the routine is repeated from the command input.

According to the first embodiment, an enemy character 82 is provided with multiple attack points in advance. Further, data of the attack area 91 is prepared in advance for each weapon or type of magic. At the time of the fight, the attack area 91 of the weapon or magic is displayed on the display screen 61 in accordance with the weapon or type of magic selected by the player. Further, attack points positioned inside the attack area 91 are detected. The attack is authorized for the detected attack points. The player can select any point among the attack points for which the attack is authorized as the subject of the attack, so the modes of the fight scenes become more diverse and the tactical nature and interest of the game are enhanced.

Further, according to the first embodiment, the attack area 91 is displayed by a wire frame model, so the area may be displayed three-dimensionally. Further, since the wires of the wire frame model move along the contour surfaces of the attack area 91, the attack area 91 can be displayed to appear three-dimensionally. Therefore, the attack area 91 can be easily discerned.

Further, according to the first embodiment, the program of the battle processing is stored in the program product 4, that is, the CD-ROM. Therefore, the program product 4 can be easily distributed and sold separately from the console 2 as a software product. Further, by using a computer or other hardware to use this software, it becomes possible to easily work the game technology of the first embodiment by the hardware.

Note that it is also possible to configure the system to simultaneously select attack points of multiple locations in the attack area 91.

Further, in the first embodiment, the attack area 91 was explained as being set for a weapon or type of magic, but the invention is not limited to this. For example, the invention may also be configured to set the attack area for a type of attack action such as "KICK" and "PUNCH". Further, it is not limited to attack and may also be configured to set a defense area corresponding to a defense type magic or defensive gear or a defense action such as "TAKE DEFENSIVE POSTURE".

Further, in the first embodiment, the attack area 91 was explained as being displayed by a wire frame model, but the invention is not limited to this. For example, the surface of the attack area 91 may also be displayed semitransparently in a color different from its surrounding.

Still further, in the first embodiment, the attack area 91 was explained as being generated as an object in a three-dimensional virtual space, but the invention is not limited to this. For example, the attack area 91 alone may be separately prepared and positioned together on an image showing the fight scene for a combined display.

Further, in the first embodiment, what the player character attacked was explained to be an enemy character, but the invention is not limited to this. For example, what is attacked may be a wall or other simple object.

Second Embodiment

Next, an explanation will be given of a second embodiment of the present invention.

One of the points of difference of the second embodiment from the first embodiment lies in the point that multiple attack points which may be covered by an attack when an enemy character attacks a player character are set for the player character. Below, the attack points set for the player character will be referred to as defense points.

Another of the differences of the second embodiment from the first embodiment is that when an enemy character attacks a defense point of the player character, the damage of the directly attacked defense point (hereinafter referred to as the "main defense point") has an effect on the other defense points of the player character positioned near that defense point. The other defense points reached by the damage of the main defense point are referred to as "secondary defense points".

To realize the above damage control, the game system 1 is provided with the following four means in addition to the configuration of the first embodiment. The first means is a damage judging means for judging the main defense point directly attacked by the opponent character and the magnitude of that damage. The second means is a specifying means for specifying secondary defense points reached by damage from the main defense point. The third means is a secondary damage computing means for calculating the magnitude of the damage received by the secondary defense points (hereinafter referred to as the "secondary reach") based on the magnitude of the damage of the main defense point. The fourth means is an updating means for updating the amount of damage of the player character based on the magnitude of the damage received by the main defense point and the secondary defense point. The damage judging means, specifying means, secondary damage computing means, and updating means are all mainly realized by the controller 11.

The rest of the configuration and functions are the same as those of the first embodiment. Components the same as in the first embodiment are given the same reference numerals as in the first embodiment and duplicate explanations are omitted. Next, an explanation will be given of the points different from the first embodiment.

For the above damage control, the memory configuration of the RAM 12 of the second embodiment differs from that of the first embodiment.

Figure 12:
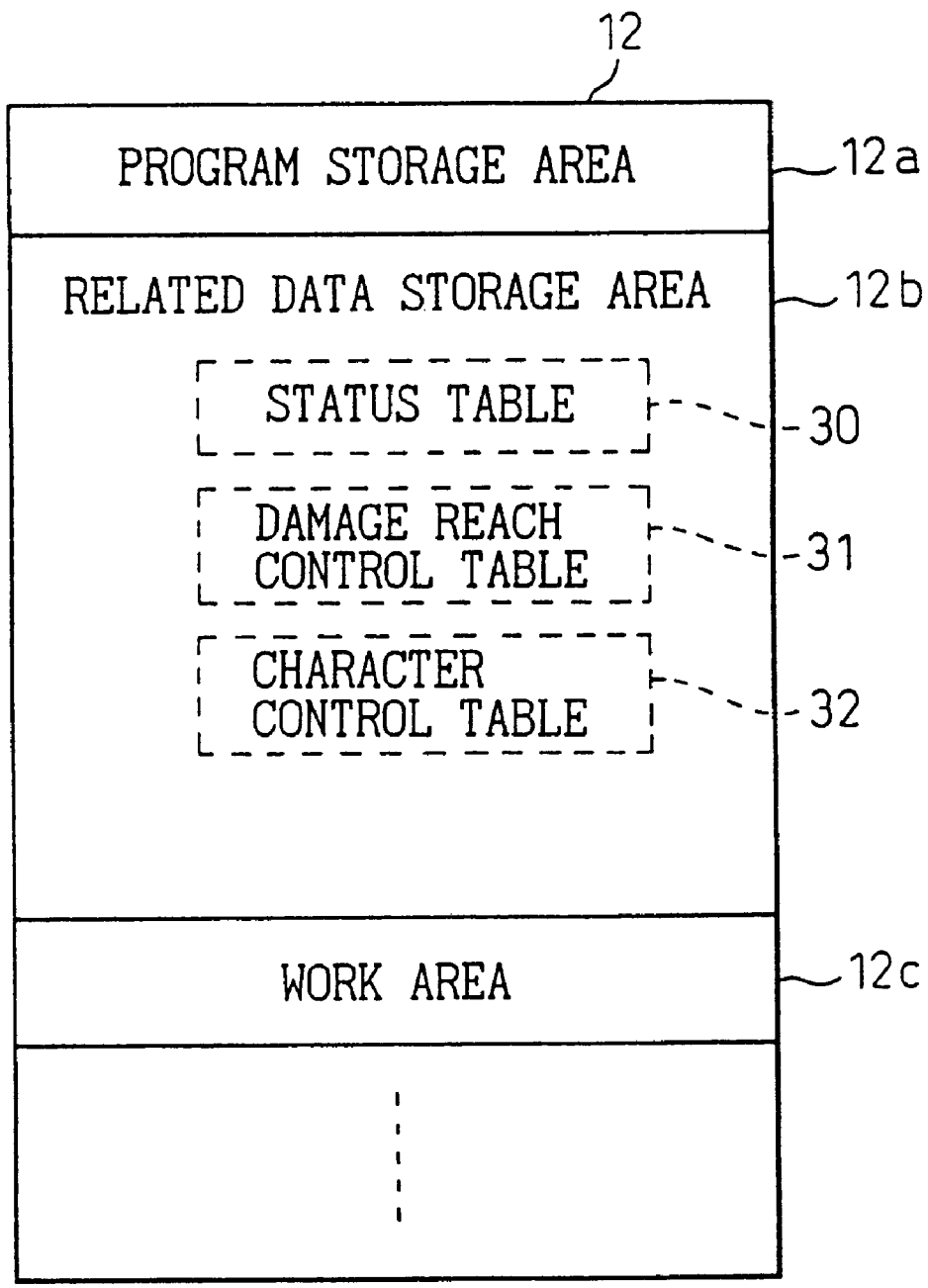
FIG. 12 is a view of a memory configuration of a RAM in a second embodiment.

FIG. 12 is a view of the memory configuration of the RAM 12 in the second embodiment.

The related data storage area 12b of the RAM 12 stores a status table 30 storing the fight data of the player character, the later explained damage reach control table 31, the character control table 32, etc.

FIG. 13 is a view of a data structure of the status table 30.

The status table 30 is configured with an "ATTACK POWER" row 301, a "HIT RATE" row 32, a "DEFENSE POWER" row 303, an "EVASION RATE" row 304, a "LIFE POINT" row 305, and "HIT POINT" row 306 storing values of, for example, the attack power, hit rate, defense power, evasion rate, life points (LP), and hit points (HP).

The values of the attack power, hit rate, defense power, and evasion rate mean the same as in the first embodiment. The "LIFE POINT" column 305 stores the life points of the player character. The life points show the life force of the player character. When the life points reach zero, the player character dies.

The "HIT POINT" column 306 stores the hit points of the player character. The hit points are provided for every defense point of the player character. In the example shown in FIG. 13, the defense points are set for the head, arms, chest, stomach, and legs of the player character. Therefore, the "HIT POINT" column 306 stores five sets of hit points for the head, arms, chest, stomach, and legs. The enemy character attacks designate one or more points to be attacked from the five defense points.

When the attack results in the hit points of a certain defense point becoming zero, the operation of the location of the character corresponding to the defense point becomes invalid. For example, when the hit points of the arms become zero, the character does not die, but attacks by weapons using the arms are no longer possible. Further, when the hit points of the legs become zero, the character does not die, but the character can no longer move or is otherwise damaged. Further, when the hit points of the defense points are reduced due to the damage of the attack, the life points are reduced by a rate commensurate with that.

While not particularly illustrated, a status table of a similar configuration is stored in the related data storage area 12b for the enemy characters as well. Further, the enemy characters are also controlled by the life points and hit points in the same way as the player character.

FIG. 14 is a view of the data structure of the damage reach control table 31.

The damage reach control table 31 is configured with a "SECONDARY DEFENSE POINT" column 311 and "PROPORTION OF DAMAGE REACHED" column 312. The "SECONDARY DEFENSE POINT" column 311 and "PROPORTION OF DAMAGE REACHED" column 312 store the secondary defense points reached by the damage and the proportion of damage reaching the second defense points for each of the five defense points of, for example, the head, arms, chest, stomach, and legs. According to the illustrated example, when the head is attacked, damage of 5 percent and 8 percent of the damage inflicted on the head reach the arms and chest, respectively.

FIG. 15 is a view of the data structure of the character control table 32.

The character control table 32 is a table storing parameters relating to a fight by the player character and data for control of changes in the display mode in accordance with the current hit points of the defense points. The character control table 32 is configured with the "HIT POINT MAXIMUM VALUE" column 321 and the "CONTROL CONTENT" columns 322. The "HIT POINT MAXIMUM VALUE" column 321 stores the maximum values of the points for each defense point. The "CONTROL CONTENT" columns 322 stores the parameters relating to a fight and the contents of the change of the display modes.

According to the example shown in FIG. 15, for example, the maximum value of the hit points for the defense point of the head is 270. Further, when the hit points of the head become less than 50 percent of the maximum value, that is, less than 135, the head of the player character is displayed by an orange color. Further, the attack power and defense power of the player character are reduced by 20 percent each. Further, when the hit points of the head are reduced and become zero percent of the maximum value, that is, zero, the head of the player character is displayed by a blinking red color. Further, the attack power and defense power of the player character are reduced by 30 percent each.

Next, an explanation will be made of the damage processing in the second embodiment.

In the same way as the first embodiment, at startup, the controller 11 reads the program and data necessary for execution of the game from the program product 4, that is, CD-ROM, through the CD-ROM drive 16 and transfers it to the RAM 12 based on an operating system stored in the built-in ROM. Further, the controller 11 executes the program transferred to the RAM 12 to execute the various processing described below. Note that among the control operations performed by the game system 1, there are operations where circuits other than the controller 11 cooperate with the controller 11 for the actual control. For the convenience of the explanation, below, an explanation will be made assuming that control involving the controller 11 is direct control by the controller 11. Further, in the same way as the first embodiment, to facilitate understanding of the invention, detailed explanations of the read operation of the data from the CD-ROM and the transfer to the RAM 12 are omitted.

Figure 16:
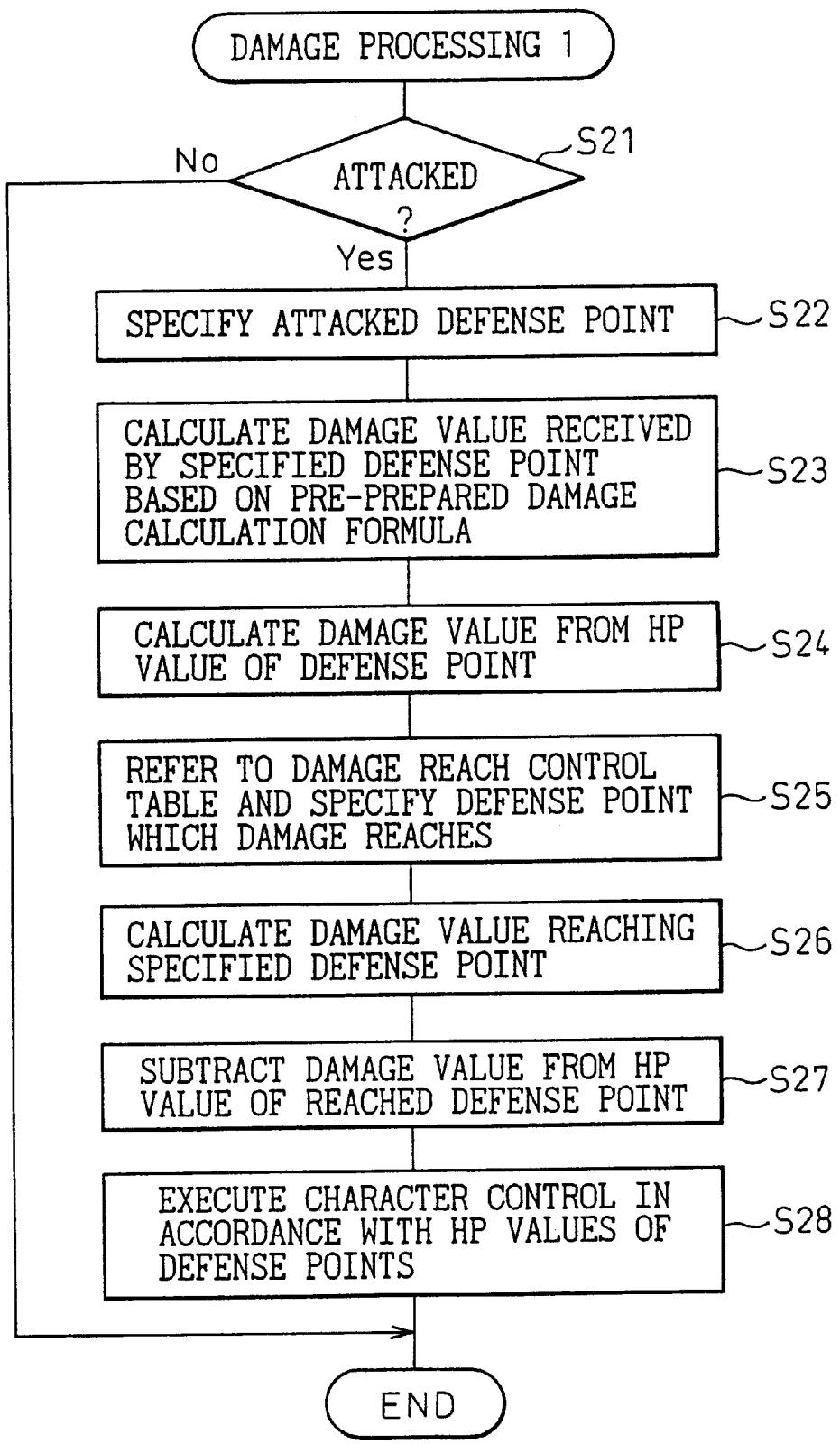
FIG. 16 is a flow chart of the damage processing of the second embodiment.

FIG. 16 is a flow chart of damage processing of the second embodiment.

Figure 17:
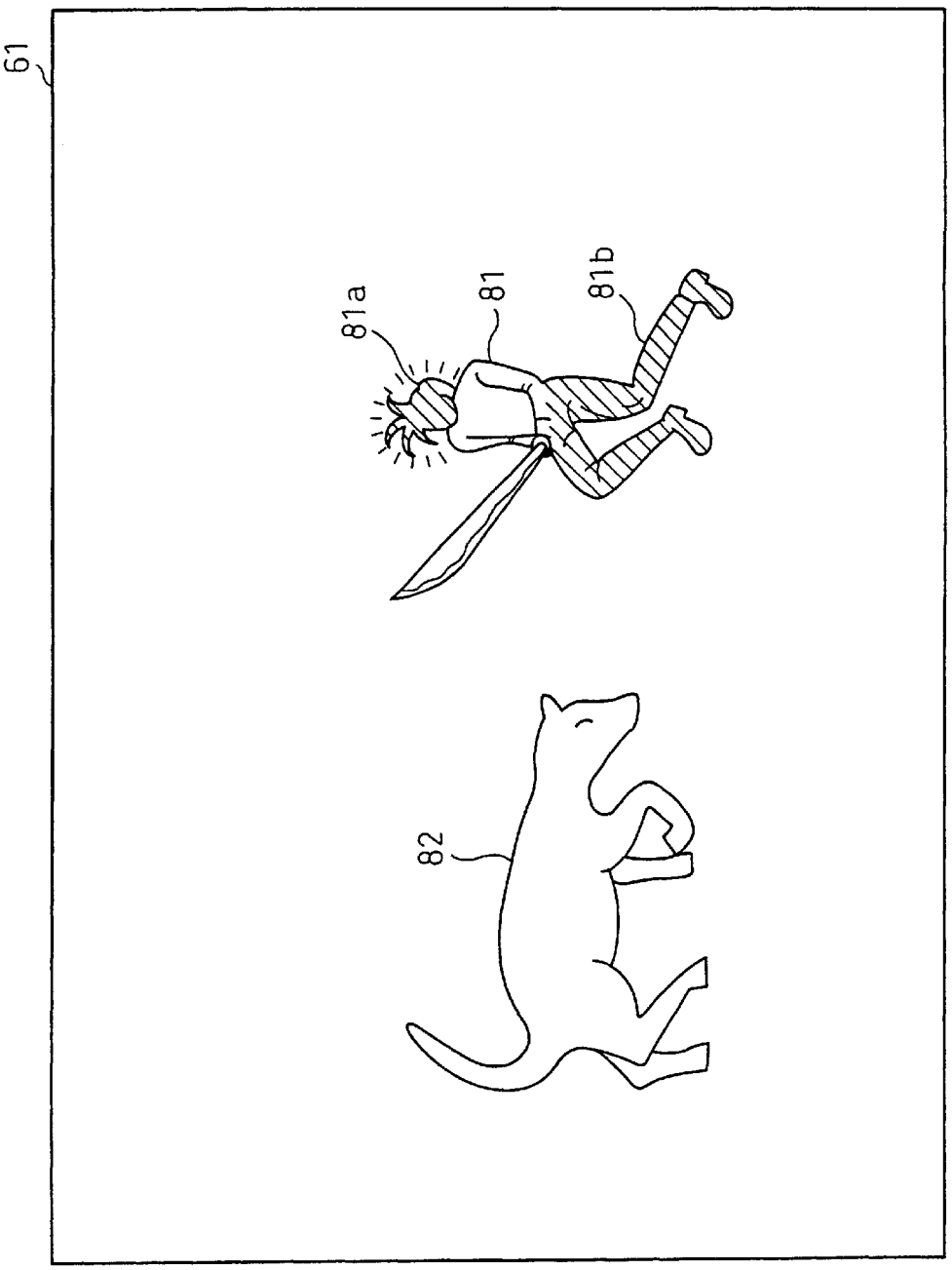
FIG. 17 is a view of an example of a screen display in damage processing of the second embodiment.

An explanation will be given next of the damage processing with reference to the example of the screen display shown in this figure and FIG. 17.

As shown in FIG. 16, when the damage processing begins, first, it is judged if the player character has been attacked (step S21). When not attacked, the damage processing ends. When attacked, first the defense point directly attacked (main defense point) is specified (step S22).

Next, the status table 30 of the player character (see FIG. 13) and the status table of the enemy character (not shown) are referred to. Further, the damage value received by the specified main defense point is calculated (step S23). Specifically, the controller 11 enters the parameters of the fight power of the player character and the fight power of the enemy character and random numbers into a predetermined damage calculation formula to calculate the damage value. When the damage value of the main defense point is obtained, that damage value is subtracted from the hit points of the main defense point (step S24). The obtained new hit points are stored in the status table 30 of the player character. Due to this, the corresponding value of the "HIT POINT" column 306 of the status table 30 is updated.

Next, the damage reach control table 31 is referred to. Next, the secondary defense points corresponding to that main defense point are specified (step S25). Further, the rates of the damage reaching the specified secondary defense points are obtained from the damage reach control table 31. The damage values reaching the specified secondary defense points are calculated based on the rates and the damage value of the main defense point calculated at step S23 (step S26). When the damage values of the secondary defense points are obtained, the damage values are subtracted from the hit points of the secondary defense points (step S27). The obtained new hit points are stored in the status table 30 of the player character. Due to this, the corresponding values of the "HIT POINT" column 306 of the status table 30 are updated.

Next, the hit points of the status table 30 of the player character (see FIG. 13) are referred to. Further, the parameters relating to the fight of the player character and the display mode are changed in accordance with the hit points of the defense points (step S28). For example, when a change in the hit points result in the hit points of the head of the player character becoming zero percent of the maximum value, that is, zero, and the hit points of the legs becoming less than 50 percent of the maximum value, as in the example of display shown in FIG. 17, the head 81a of the player character 81 is displayed by a blinking red color and the legs 81b are displayed by an orange color. Due to this, the player can easily discern the state of the hit points of the player character 81. Further, in the fight parameters of the player character, the attack power and defense power both fall 30 percent. Further, the hit rate and evasion rate both fall 10 percent. Also, the speed of movement falls 20 percent.

According to the second embodiment, when a certain defense point of the player character 81 is attacked and receives damage, the damage reaches the other defense points positioned near to the defense point receiving that damage. Therefore, the tactical nature and interest of the game are enhanced.

Note that in the second embodiment, damage obtained by multiplying the damage received by the main defense point by a predetermined rate was explained as reaching the secondary defense points, but the invention is not limited to this. For example, the invention may be configured so that damage received by the main defense point is split between the main defense point and the secondary defense points. That is, the damage which should be received by the main defense point may be distributed to the main defense point and the secondary defense points.

Further, the locations and numbers of the defense points set for the player character 81 are not limited to the second embodiment and may be freely designed and set. Further, when the player character 81 is equipped with defensive gear, control may be performed so that the magnitude of the damage directly received from the enemy character 82 due to the attack and the rate of damage reaching other points from there are reduced compared when it is not equipped with defensive gear. Further, in the second embodiment, the explanation was made of damage control for the player character 81, but the invention may be configured so that the same type of damage control, as with the player character 81, is performed for the enemy character 82, as well.

Third Embodiment

Next, an explanation will be given of a third embodiment of the present invention.

The third embodiment is configured in the same way as the second embodiment so that in the control for the spread (or distribution) of damage, the secondary defense points reached by (or distributed with) the damage of the main defense point are specified based on the distances to the defense points. Further, in the third embodiment, the rates of the damage reaching (or distributed with) the specified secondary defense points are controlled in accordance with the distance between the main defense point and the secondary defense points.

To realize the above damage control, the controller 11 further has the function of calculating the distance to the defense points based on, for example, the coordinate data of the defense points. The rest of the configuration and functions are the same as in the first embodiment and second embodiment. Components of the configuration the same as in the first embodiment and second embodiment are given the same reference numerals as in those embodiments and duplicate explanations are omitted. Below, only points different from the first and second embodiments will be explained.

For the above damage control, in the third embodiment, the data structure of the damage reach control table differs from that of the second embodiment.

Figure 18:
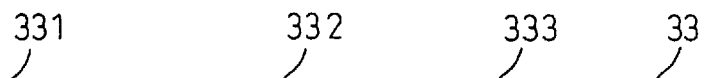
FIG. 18 is a view of a data structure of a damage reach control table stored in a third embodiment.

FIG. 18 is a view of the data structure of the damage reach control table 33 in the third embodiment.

The damage reach control table 33 is configured with a "COORDINATE DATA" column 331, a "DISTANCE" column 332, and a "PROPORTION OF DAMAGE REACHED" column 333. The "COORDINATE DATA" column 331 stores the current relative coordinate data with respect to the character coordinates of the player character for every defense point. The "DISTANCE" column 332 stores conditions defining the distance to the main defense point for every defense point. The "PROPORTION OF DAMAGE REACHED" column 333 stores, for the defense points, rates of damage reaching (or distributed to) the secondary defense points for every distance to the main defense point.

According to the example shown in FIG. 18, when for example the head is attacked as the main defense point, the other defense points positioned within a distance of 0 to 50 units from the head are specified as secondary defense points. Further, the damages of the secondary defense points specified at that time become 5 percent of the damage of the main defense point. Further, the other defense points positioned within a distance of 50 to 70 units from the head are also specified as secondary defense points. These specified secondary defense points are further from the head than the secondary defense points specified as being a distance of 0 to 50 units from the head, so the damage become 3 percent of the damage of the main defense point. Here, the distances to the defense points are calculated based on the coordinate data.

Next, an explanation will be given of the damage processing in the third embodiment.

In the same way as the first embodiment, at startup, the controller 11 reads the program and data necessary for execution of the game from the program product 4, that is, CD-ROM, through the CD-ROM drive 16 and transfers it to the RAM 12 based on an operating system stored in the built-in ROM. Further, the controller 11 executes the program transferred to the RAM 12 to execute the various processing described below. Note that among the control operations performed by the game system 1, there are operations where circuits other than the controller 11 cooperate with the controller 11 for the actual control. For the convenience of the explanation, below, an explanation will be made assuming that control involving the controller 11 is direct control by the controller 11. Further, in the same way as the first and second embodiments, to facilitate understanding of the invention, detailed explanations of the read operation of the data from the CD-ROM and the transfer to the RAM 12 are omitted.

FIG. 19 is a flow chart of damage processing of the third embodiment.

As shown in FIG. 19, when the damage processing begins, first, it is judged if the player character has been attacked (step S31). When not attacked, the damage processing ends. When attacked, first the defense point directly attacked (main defense point) is specified (step S32).

Next, the status table 30 of the player character (see FIG. 13) and the status table of the enemy character (not shown) are referred to. When the damage value of the main defense point is obtained, that damage value is subtracted from the hit points of the main defense point (step S34). The obtained new hit points are stored in the status table 30 of the player character. Due to this, the corresponding value of the "HIT POINT" column 306 of the status table 30 is updated.

Next, the damage reach control table 31 is referred to. Next, the distances from the specified main defense point to the other defense points are calculated based on their coordinate data (step S35). The calculated distances are compared with the corresponding distance conditions of the main defense point in the "DISTANCE" column 332 of the damage reach control table 33. Further, the defense points matching the distance conditions are specified as secondary defense points (step S36).

Next, the rates of the damage reaching the specified secondary defense points are obtained in accordance with the distances calculated at step S35. The damage values reaching the specified secondary defense points are calculated based on the rates and the damage value of the main defense point calculated at step S33 (step S37). When the damage values of the secondary defense points are obtained, the damage values are subtracted from the hit points of the secondary defense points (step S38). The obtained new hit points are stored in the status table 30 of the player character. Due to this, the corresponding values of the "HIT POINT" column 306 of the status table 30 are updated.

Next, the hit points of the status table 30 of the player character (see FIG. 13) are referred to. Further, the parameters relating to the fight of the player character and the display mode are changed in accordance with the hit points of the defense points (step S39).

According to the third embodiment, in addition to effects the same as the second embodiment, when a certain defense point of the player character 81 is attacked and receives damage, the secondary defense points which that damage reaches are specified by the distances to those defense points. Further, the magnitudes of the damage reaching the specified secondary defense points are also determined based on the distances between the main defense point and the secondary defense points. Therefore, the tactical nature and interest of the game are enhanced.

The present invention was explained in detail above based on the first, second and third embodiments, but the invention is not limited to these embodiments. Suitable changes may of course be made within the scope and spirit of the invention.

For example, in the above embodiments, realization of the present invention was explained using a home game system as a platform. The present invention, however, may also be realized using a personal computer or other general computer or arcade game machine as a platform. Further, the present invention may also be realized using a cellular phone, hand held data terminal, car navigation system, or other communications terminal as a platform.

Further, in the above embodiments, the program or data for realization of the present invention was stored in a CD-ROM and that CD-ROM used as a program product. The program product, however, is not limited to a CD-ROM. It may also be a digital versatile disc (DVD) or other computer readable magnetic or optomagnetic medium or semiconductor memory.

Further, the program and data for realizing the present invention are not limited to forms supplied by a CD-ROM or other program product 4 which can be loaded into and unloaded from a game system or computer. That is, the program and data for realizing the present invention may also be of a form downloaded from another apparatus on the network 100 connected through the communications line 99 by the communications interface 17, shown in FIG. 1. Further, the program and data may also be stored in a memory of another apparatus on the network 100 connected through the communications line 99 and that program and data successively stored in the RAM 12 through the communications line 99.

Summarizing the effects of the invention, according to the present invention, a plurality of attack points or defense points are provided for a character or a target object and the damage inflicted or the damage received by an attack or a change of status is controlled for each attack point or defense point, so the damage differs for each attack point or defense point as a result of the same attack. Accordingly, the tactical nature is improved, the modes of the fight are diversified, and the game is made more interesting and more dramatic.

The present disclosure relates to subject matter contained in priority Japanese Patent Application No. HEI 11-185576, filed on Jun. 30, 1999, the contents of which is herein expressly incorporated by reference in its entirety.

What is claimed is:

1. A computer readable program product for storing a game program that provides a plurality of attack points on a target object positioned in an attack area set in a virtual space and makes the computer:

display the attack area showing an effective range of attack when an attack on said target object is instructed in response to an operation, detect attack points positioned in the displayed attack area, and obtain a fight result based on the attack for at least one detected attack point.

2. The computer readable program product as set forth in claim 1, further making said computer highlight detected attack points after detecting attack points and before obtaining the fight result.

3. The computer readable program product as set forth in claim 2, further making said computer:

select an attack point to be attacked in accordance with an input operation, from the highlighted attack points after detecting attack points and before obtaining the fight result and, in which obtaining the fight result further comprises obtaining the fight result based on the attack on the selected attack point from among the detected attack points.

4. The computer readable program product as set forth in claim 3, further making said computer:

when selecting the attack point, calculate an expected result of the attack on the detected attack point; and display the calculated attack point.

5. A computer readable program product for storing a game program, providing a plurality of defense points for judging damage on a character on a display screen due to an attack from an opponent character in the progress of a game and making the computer:

judge a main defense point, directly receiving an attack from the opponent character among the plurality of defense points, and a magnitude of the damage, specify secondary defense points positioned near the judged main defense point and reached by damage to the main defense point, calculate the magnitude of the damage reaching the specified secondary defense points based on the magnitude of the damage to the main defense point, and update the amount of damage of the character based on the calculated magnitude of the damage.

6. The computer readable program product as set forth in claim 5, which product stores a program storing in advance a correspondence between a main defense point and secondary defense points reached by damage to the main defense point for each of said plurality of defense points, and further making the computer refer to said correspondence and specify secondary defense points based on said main defense point.

7. The computer readable program product as set forth in claim 5, which product stores a program storing in advance position data for each of the plurality of defense points and further making the computer:

calculate distances from said judged main defense point to other defense points based on position data of the defense points after judgement of the magnitude of the damage and before selection of the secondary defense points; and select secondary defense points based on the calculated distances from the main defense point.

8. The computer readable program product as set forth in claim 7, in which calculation of the magnitude of damage reaching the secondary defense points further comprises calculating magnitudes of damage reaching said secondary defense points based on the calculated distances from the main defense point to the specified secondary defense points.

9. The computer readable program product as set forth in claim 5, in which the product further makes the computer highlight a defense point when the defense point accumulates more than a predetermined amount of damage.

10. A computer readable program product for storing a game program, which product stores a program providing a plurality of attack points on a target object positioned in an attack area set in a virtual space and making the computer:

form an attack screen for the target object in response to an input operation, display the attack area showing an effective range of attack designated in response to the input operation on the formed attack screen, highlight attack points positioned in the displayed attack area, and obtain a fight result based on the attack for at least one highlighted attack point.

11. A method of control of a game comprising:

providing a plurality of attack points on a target object positioned in an attack area set in a virtual space, displaying the attack area showing an effective range of attack when an attack on said target object is instructed in response to an operation of a player character, detecting attack points positioned in the displayed attack area, and obtaining a fight result based on the attack for at least one detected attack point.

12. A method of control of a game comprising:

providing a plurality of defense points for judging damage on a character on a display screen due to an attack from an opponent character in the progress of a game, judging a main defense point, directly receiving an attack from the opponent character among the plurality of defense points, and a magnitude of the damage, specifying secondary defense points positioned near the judged main defense point and reached by damage to the main defense point, calculating the magnitude of the damage reaching the specified secondary defense points based on the magnitude of the damage to the main defense point, and updating the amount of damage of the character based on the calculated magnitude of the damage.

13. The method of control of a game as set forth in claim 12, further comprising:

storing in advance a correspondence between the main defense point and secondary defense points damaged by damage to the main defense point for each of said plurality of defense points, and referring to said correspondence and specifying secondary defense points based on said main defense point when specifying the secondary defense points.

14. The method of control of a game as set forth in claim 12, further comprising:

storing in advance position data for each of the plurality of defense points, calculating distances from said judged main defense point to secondary defense points based on position data of the defense points after judgement of the magnitude of the damage and before selection of the secondary defense points, and selecting secondary defense points based on the calculated distances from the main defense point.

15. A method of control of a display comprising:

providing a plurality of attack points on a target object positioned in an attack area set in a virtual space, forming an attack screen for the target object in response to an input operation, displaying the attack area showing an effective range of attack designated in response to an input operation on the formed attack screen, highlighting attack points positioned in the displayed attack area, and obtaining a fight result based on the attack for at least one highlighted attack point.

16. A mechanism comprising a computer for controlling a program and a program product storing a program for making the computer control the game, wherein said program:

provides a plurality of attack points on a target object positioned in an attack area set in a virtual space and make the computer:

display the attack area showing an effective range of attack when an attack on said target object is instructed in response to an operation of a player, detect attack points positioned in the displayed attack area, and obtain a fight result based on the attack for at least one detected attack point.

17. A mechanism comprising a computer for controlling a program and a program product storing a program for making the computer control the game, wherein said program:

provides a plurality of defense points for judging damage on a character on a display screen due to an attack from an opponent character in the progress of a game and makes the computer:

judge a main defense point, directly receiving the attack from the opponent character among a plurality of defense points, and a magnitude of the damage, specify secondary defense points positioned near the judged main defense point and reached by damage to the main defense point, calculate the magnitude of the damage reaching the specified secondary defense points based on the magnitude of the damage to the main defense point, and update the amount of damage of the character based on the calculated magnitude of the damage.

18. A mechanism comprising a computer for controlling a program and a program product storing a program for making the computer control the game, wherein said program provides a plurality of attack points on a target object positioned in an attack area set in a virtual space and makes the computer:

form an attack screen for the target object in response to an input operation, display the attack area showing an effective range of attack designated in response to the input operation on the formed attack screen, highlight attack points positioned in the displayed attack area, and obtain a fight result based on the attack for at least one highlighted attack point.

* * * * *